United States Patent
Boehler et al.

(10) Patent No.: US 12,485,195 B2
(45) Date of Patent: Dec. 2, 2025

(54) METHOD FOR AUTOMATIC AND STERILE-CONTAINER-SPECIFIC DETECTION OF STERILISATION CYCLES CARRIED OUT BY A STERILE CONTAINER

(71) Applicant: Aesculap AG, Tuttlingen (DE)

(72) Inventors: Lukas Boehler, Furtwangen (DE); Matthias Henke, Villingen-Schwenningen (DE); Mateusz Daniol, Kozlow (PL)

(73) Assignee: Aesculap AG, Tuttlingen (DE)

( * ) Notice: Subject to any disclaimer, the term of this patent is extended or adjusted under 35 U.S.C. 154(b) by 617 days.

(21) Appl. No.: 17/793,449

(22) PCT Filed: Jan. 20, 2021

(86) PCT No.: PCT/EP2021/051109
§ 371 (c)(1),
(2) Date: Jul. 18, 2022

(87) PCT Pub. No.: WO2021/148425
PCT Pub. Date: Jul. 29, 2021

(65) Prior Publication Data
US 2023/0033001 A1   Feb. 2, 2023

(30) Foreign Application Priority Data
Jan. 24, 2020 (DE) ............. 10 2020 101 655.7

(51) Int. Cl.
*A61L 2/24* (2006.01)
*A61L 2/04* (2006.01)
(Continued)

(52) U.S. Cl.
CPC ............ *A61L 2/24* (2013.01); *A61L 2/04* (2013.01); *A61L 2/28* (2013.01); *G01K 1/022* (2013.01);
(Continued)

(58) Field of Classification Search
CPC ..................................................... A61L 2/28
See application file for complete search history.

(56) References Cited

U.S. PATENT DOCUMENTS

| 5,565,634 A | 10/1996 | Graessle et al. |
| 10,556,031 B2 | 2/2020 | Weisshaupt |
(Continued)

FOREIGN PATENT DOCUMENTS

| CN | 107154145 A | 9/2017 |
| DE | 69519474 T2 | 4/2001 |
(Continued)

OTHER PUBLICATIONS

Written Opinion received in International Application No. PCT/EP2021/051109 dated May 12, 2021, with translation, 23 pages.
(Continued)

*Primary Examiner* — Kevin Joyner
(74) *Attorney, Agent, or Firm* — Christopher A. Rothe; CM Law

(57) ABSTRACT

A method for automatic and sterile-container-specific detection of sterilization cycles carried out by a sterile container, and a system for carrying out the method. A temperature acting on the sterile container is detected using a temperature measurement device associated with the sterile container. A temperature measurement device detects the temperature at fixed first time intervals. Detected temperature values are stored in a memory once a predetermined first limit temperature has been exceeded. Storage of detected temperature values is suspended once a predetermined second limit temperature has been undershot or after a predetermined duration has elapsed after the first limit temperature has been exceeded. The stored temperature values are compared with reference temperature values. A deviation between the temperature values and the reference temperature values is determined. A counter and/or a display device
(Continued)

Figure 1:
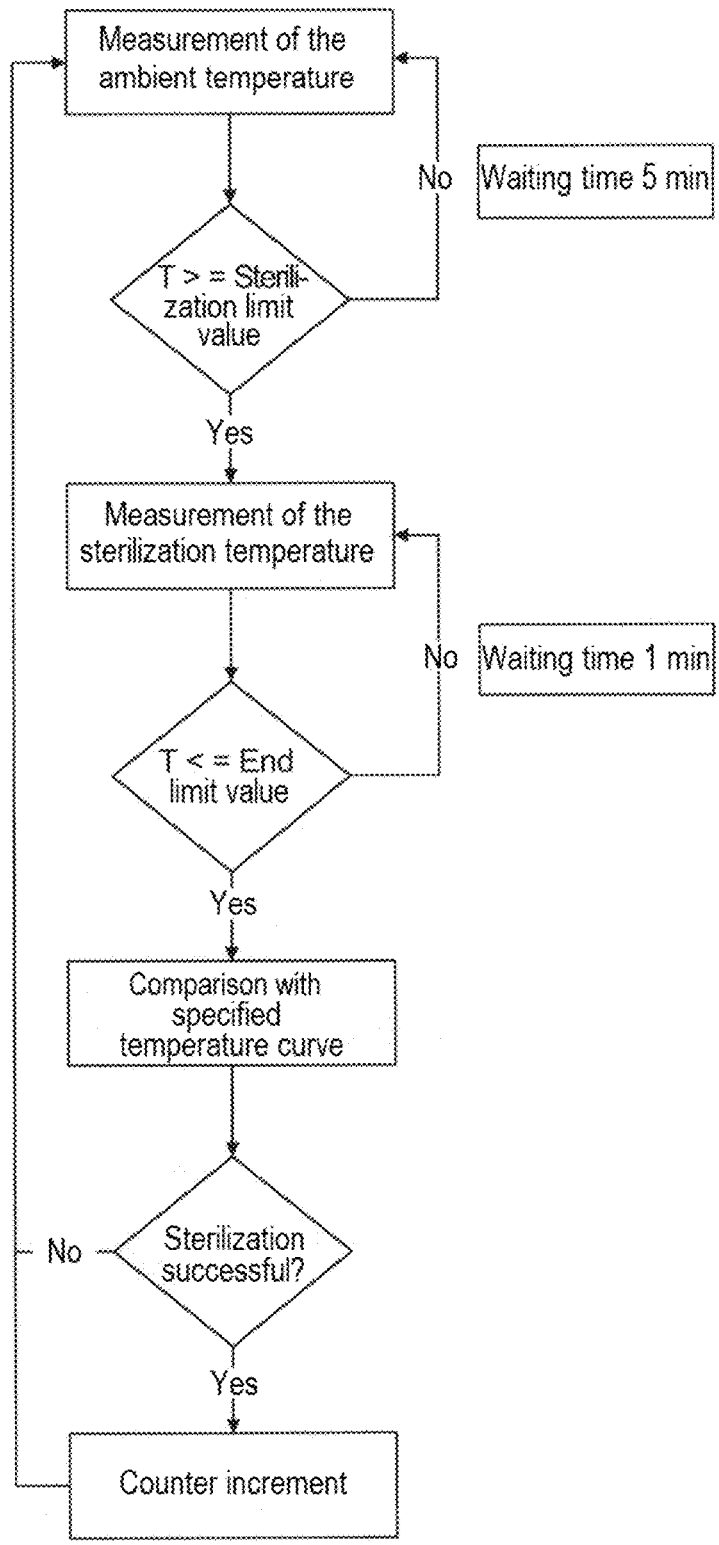

are/is actuated when a deviation is determined within a predetermined tolerance range.

12 Claims, 2 Drawing Sheets

(51) Int. Cl.
    *A61L 2/28*     (2006.01)
    *G01K 1/022*     (2021.01)

(52) U.S. Cl.
    CPC ....... *A61L 2202/14* (2013.01); *A61L 2202/23* (2013.01)

(56) References Cited

U.S. PATENT DOCUMENTS

| | | | |
|---|---|---|---|
| 2002/0085945 A1* | 7/2002 | Florkey | A61L 2/07 422/3 |
| 2004/0139291 A1 | 7/2004 | Hocker et al. | |
| 2005/0183656 A1 | 8/2005 | Isaacson et al. | |
| 2005/0260760 A1 | 11/2005 | Hucker | |
| 2006/0145840 A1 | 7/2006 | Klun | |
| 2007/0160494 A1 | 7/2007 | Sands | |
| 2007/0202005 A1 | 8/2007 | Maschke | |
| 2017/0224859 A1 | 8/2017 | Broninx et al. | |
| 2017/0252472 A1 | 9/2017 | Dang et al. | |
| 2018/0221526 A1 | 8/2018 | Weisshaupt | |

FOREIGN PATENT DOCUMENTS

| | | |
|---|---|---|
| DE | 20201752 U1 | 4/2002 |
| DE | 10254446 A1 | 6/2004 |
| DE | 102006008723 A1 | 8/2007 |
| DE | 102007039088 A1 | 2/2009 |
| DE | 102013102277 A1 | 9/2014 |
| DE | 102015112205 A1 | 2/2017 |
| EP | 1662234 A1 | 5/2006 |
| WO | 9416299 A1 | 7/1994 |
| WO | 2004097357 A2 | 11/2004 |
| WO | 2016075418 A1 | 5/2016 |
| WO | 2017016958 A1 | 2/2017 |

OTHER PUBLICATIONS

Kirckof et al., "Are You Running the Correct Streams Sterilization Cycles for Your Loads?," Education & Training, Managing Infection Control Mar. 2009, Mar. 31, 2009, 11 pages.
Metrics Hobo, "Hobo Data Loggers," Dec. 31, 2016, http;//www.datenlogger-praxis.de/Onset-HOBO-Datenlogger-Produktakatalog-2016.pdf, 54 pages.
Search Report received in German Application No. 10 2020 101 655.7 dated Sep. 24, 2020, with translation, 13 pages.
Search Report received in International Application No. PCT/EP2021/051109 dated May 12, 2021, with translation, 8 pages.
Search Report received in Chinese Application No. 202180002609.0 dated Jun. 13, 2025, with translation, 26 pages.

* cited by examiner

METHOD FOR AUTOMATIC AND STERILE-CONTAINER-SPECIFIC DETECTION OF STERILISATION CYCLES CARRIED OUT BY A STERILE CONTAINER

CROSS-REFERENCES TO RELATED APPLICATIONS

This application is the United States national stage entry of International Application No. PCT/EP2021/051109, filed Jan. 20, 2021, and claims priority to German Application No. 10 2020 101 655.7, filed Jan. 24, 2020. The contents of International Application No. PCT/EP2021/051109 and German Application No. 10 2020 101 655.7 are incorporated by reference herein in their entireties.

FIELD

The present disclosure relates to a method for the automatic and sterile-container-specific detection of sterilization cycles carried out by a sterile container, a temperature acting on the sterile container being detected by means of a temperature measurement device associated with the sterile container. This disclosure also relates to a system for the automatic and sterile-container-specific detection of sterilization cycles carried out by a sterile container, comprising a sterile container, a temperature measurement device associated with the sterile container for detecting a temperature acting on the sterile container, a memory and a counter and/or a display device.

BACKGROUND

The prior art discloses various methods for the automatic or semi-automatic detection of a number of sterilization cycles to which a medical sterile container has been subjected in the course of its use. In particular, sterilization cycles can be detected here by detecting temperature and/or pressure values and comparing them with specified limit values. Either electronic sensors or mechanical components are used for this purpose. For example, if a previously defined limit temperature is reached, this is indicated in some known methods and systems. It is also known to store a number of reached limit temperatures and make them available by reading them with a special reader.

In this context, a common system with mechanical indicators uses, for example, bimetallic elements that undergo a change in shape within a certain temperature range. Changes in shape of this type are detected by the system and allow conclusions to be drawn about temperature fluctuations to which the sterile container had been exposed. However, in a disadvantageous way, a bimetal sensor does not indicate the number of sterilizations that were carried out. Another disadvantage is that detections of individual temperature limit values are not a reliable method of confirming temperature and pressure cycles of sterilization processes. DE 10 2015 112 205 A1 discloses an apparatus for counting sterilization cycles in the sterilization of medical instruments and apparatuses using a bimetal, including a counter for recording and reproducing a number of sterilization cycles, an actuating device for the sterilization parameter-dependent actuation of the counter, and a blocking device for blocking the counter on the basis of the sterilization parameters, the actuating device actuating the counter when a first threshold sterilization parameter is exceeded, and the blocking device blocking the counter after it has been actuated and/or after a second threshold sterilization parameter has been exceeded, and unblocking it on falling below a third threshold sterilization parameter.

EP 1 662 234 A1 discloses an apparatus and a method for the electronic monitoring of a sterilization process, a measured value being detected by a plurality of sensors in the interior of a closed process room with metallic walls, detected measured values being collected and stored in a plurality of data loggers associated with the sensors in each case. The stored measured values are transmitted by radio to a receiving device outside the process room.

DE 10 2013 102 277 A1 discloses a system, a measuring instrument and a method for storing a sterilization cycle, comprising a counter for counting sterilization cycles when a threshold temperature typical of the sterilization cycle is exceeded, a memory for storing the number of sterilization cycles, and a power generation device which supplies the counter and/or the memory with power, the power supply device being designed to be self-sufficient.

DE 202 01 752 U1 discloses a measuring device for monitoring the sterilization conditions in a sterilization chamber, consisting of a data recorder which can be inserted into the sterilization chamber, a data reader outside the sterilization chamber, and an evaluation unit, the data recorder having a housing which houses a control unit, a power supply unit, a data memory and a pressure sensor, and the data reader being provided with a data output, the data recorder being connected via a sensor cable to semiconductor elements which can be introduced into the sterilization chamber and storing the temperatures measured at a plurality of locations in the sterilization chamber.

WO 94/16299 A1 discloses an apparatus for detecting the number of times that target temperatures are reached.

WO 2016/075 418 discloses a sterilization container for surgical instruments, which comprises an electronic identity apparatus for monitoring and tracing the container and its contents. It comprises a measurement module for measuring a parameter representative of an environmental condition and for generating an element of digital measurement data on the basis of the measurement, a memory module for storing the generated set of measurement data, a communication module suitable for cooperating with the memory module to transmit the determined set of measurement data to an external reader when this reader cooperates with the communication module.

US 2007/0 160 494 A1 discloses a sterilization system having an autoclave and a sterilization container provided with an RFID tag, the RFID tag containing data relating to an object to be sterilized and contained in the container, which data is read by a control unit of the autoclave and used to control the sterilization.

In summary, it can be said that it is as a rule not possible to reliably determine the number of preparations, such as especially sterilizations of medical sterile containers and instrument sets, using currently known methods for automatically detecting sterilization cycles.

A disadvantage of the above-mentioned known methods for automatically detecting and/or monitoring sterilization cycles is that a detection of temperature limit values by means of the bimetal technology is unfortunately generally inaccurate. The same applies to methods and systems that identify sterilization cycles on the basis of the exceeding of limit values. In some cases, it is only possible to adjust the limit values to a limited extent or with difficulty. Another disadvantage is that in such methods and systems, holding times to be observed for an intended sterilization are not detected in most cases.

SUMMARY

Proceeding from the above described prior art, the object of the present disclosure is to reduce the above mentioned disadvantages of the prior art, in particular to provide a method and a system with which an automatic and flexible adjustable identification of sterilization cycles is possible in a reliable and accurate way.

According to the present disclosure, this object is achieved by a method for the automatic and sterile-container-specific detection of sterilization cycles carried out by a sterile container, a temperature acting on the sterile container being detected by means of a temperature measurement device associated with the sterile container, the temperature measurement device detecting the temperature at fixed (first) time intervals, temperature values detected after a predetermined first limit temperature has been exceeded being stored in a memory, the storage of detected temperature values being suspended after the temperature has fallen below a predetermined second limit temperature or after a predetermined period of time has elapsed after the first limit temperature has been exceeded, the stored temperature values being compared with reference temperature values, a deviation of the temperature values from the reference temperature values being determined, and in the event of a deviation only within a predetermined tolerance range, a counter and/or a display device being actuated.

The object is also achieved by a system designed to carry out the method according to the disclosure. The system is in particular designed for the automatic and sterile-container-specific detection of sterilization cycles carried out by a sterile container and comprises a sterile container, a temperature measurement device associated with the sterile container for detecting a temperature acting on the sterile container, a memory and a counter and/or a display device. In particular, the system is designed to use the temperature measurement device to detect the temperature at specified (first) time intervals, to store in the memory temperature values detected after a predetermined first limit temperature has been exceeded, to suspend the storage of detected temperature values after the temperature has fallen below a predetermined second limit temperature, at the latest, however, after a predetermined period of time has elapsed after the first limit temperature has been exceeded, to compare the stored temperature values with reference temperature values and to determine a deviation of the temperature values from the reference temperature values, and in the event of a deviation only within a predetermined tolerance range, to actuate the counter and/or the display device.

In the context of the disclosure, the temperature measurement device can preferably be an integral part of the sterile container. Alternatively or additionally, the temperature measurement device can be a part, in particular an integral part, of a screen basket and/or an outer packaging of the sterile container. In this sense, a sterile-container-specific detection can thus also be understood in the context of the disclosure to mean a detection in which the detection takes place specifically for screen baskets and/or outer packaging associated with a sterile container. Preferably, the temperature measurement device is a temperature logger that renders possible simple automatic monitoring and detection of temperatures and/or temperature curves. Preferably, the temperature measurement device is programmable so that the first and second limit temperatures and/or the first and second time intervals can be freely selected and chosen/programmed.

Preferably, the first limit temperature and/or the second limit temperature can be adjusted according to a need to cover and account for different environmental conditions. By selecting the two limit temperatures, a range can be defined in the sense of the invention, so to speak, within which the presence of a sterilization process is assumed.

According to the disclosure, the stored temperature values are compared with reference temperature values and a deviation of the temperature values from the reference temperature values is determined. This can be done continuously in real time while the temperature is being measured or only on falling below the second temperature limit or a time limit. In particular, the detected values can be compared with a predetermined temperature-time curve and evaluated on the basis of a tolerance range.

Furthermore, it can preferably be said that the disclosure can provide, on the one hand, the possibility of a kind of basic monitoring/rough monitoring and, on the other hand, the possibility of sterilization monitoring/fine monitoring. In the context of the basic monitoring/rough monitoring, the temperature is preferably detected at first (long) time intervals, i.e. at time gaps determined/defined by the first time intervals. In the context of sterilization monitoring/fine monitoring, the temperature is preferably detected at second short time intervals, i.e. at time gaps determined/defined by the second time intervals. By a corresponding selection of the length of the first and second time intervals, the rough monitoring and the fine monitoring can be adjusted in the best possible way to the respectively existing conditions.

By means of the disclosure, rough monitoring renders possible in particular continuous monitoring of the sterile container or monitoring of the sterile container over a long period of time. For example, the sterile container can be monitored over an entire period between two test cycles. The first time intervals are preferably selected to be relatively long, so that even in the case of storage of the temperature values detected in the process, for example as part of quality assurance, the detected data volumes do not become too large in the case of continuous monitoring over a long period of time. Effectively, a continuous, complete monitoring is possible over the entire period of use and/or service life of the sterile container.

Within the scope of the fine monitoring, which is triggered when the first limit temperature is exceeded, a particularly fine monitoring of a sterilization cycle or of a possibly present sterilization cycle can take place. The second time intervals are preferably selected to be relatively short, i.e. shorter than the first time intervals, so that particularly fine/fine-mesh monitoring of the sterile container is possible after the first limit temperature has been exceeded. The large volumes of data generated by fine-mesh monitoring are relatively uncritical since fine monitoring generally only takes place over relatively short periods of time, namely until the temperature falls below the second limit temperature or the predetermined time period has elapsed and recording of the temperature values is suspended. Thus, particularly fine monitoring of a sterilization process is possible.

A particular advantage of the disclosure is that the changes from rough monitoring to fine monitoring run automatically, triggered by the exceeding of the first limit temperature. Similarly, the changes from fine monitoring to rough monitoring run automatically, triggered when the temperature falls below the second limit temperature or the predetermined time period elapses. The invention thus advantageously allows, in particular automatically, a detection of sterilization cycles and/or detection of temperature curves, a measurement at predetermined time intervals and a comparison with predetermined temperatures/temperature curves. Furthermore, the changes between the measurement intervals can be performed automatically.

On the basis of the disclosure, a deviation of the temperature values from the reference temperature values is also determined. If the deviation is merely within the predetermined tolerance range, the presence of an actual sterilization process/sterilization cycle is assumed and a counter, in particular in the form of an incrementable cycle counter, is used to document the sterilization processes performed with the sterile container. The disclosure can thus advantageously effect automatic detection and display of sterilization cycles carried out with the sterile container.

Advantageous embodiments of the disclosure are explained in more detail below.

One embodiment of the disclosure is characterized in that the counter is not actuated in the event of a deviation outside the predetermined tolerance range. Alternatively or additionally, an error message can be output and/or stored. Preferably, such an indicator is reversible. In this way, the disclosure allows malfunctions in sterilization and preparation processes to be easily and reliably determined and indicated.

In the context of the method according to the invention, the first intervals in which the temperature to which the sterile container is exposed is measured/detected can have a time duration of between about three minutes to about seven minutes. Preferably, their time duration is between about four minutes to about six minutes, more preferably about five minutes.

A further embodiment of the disclosure is characterized in that, after the first limit temperature has been exceeded, the temperature measurement device detects the temperature at fixed second intervals. These second intervals are preferably shorter than the first time intervals. According to one embodiment of the disclosure, they can have a duration of between about 20 seconds to about 120 seconds, preferably between about 40 seconds to about 90 seconds, more preferably of about 60 seconds.

A further embodiment of the disclosure is characterized in that, on falling below the predetermined second limit temperature, the temperature measurement device again detects the temperature at the predetermined first intervals. Alternatively, after the predetermined period of time has elapsed after the first limit temperature has been exceeded, the temperature measurement device can again detect the temperature at the predetermined first intervals. Preferably, the first limit temperature and/or the second limit temperature is or are adjustable.

According to a further embodiment of the disclosure, particularly good monitoring of sterilization processes can be effected by detecting temperature-specific holding time durations after the first limit temperature has been exceeded and storing them in a memory. In particular, the stored holding time durations can be compared with reference holding time durations and a deviation of the holding time durations from the reference holding time durations can be determined. Due to the short measurement intervals in the form of the second intervals, holding times can be detected particularly well and accurately. The disclosure thus renders possible a particularly simple detection of temperatures and identification of sterilizations on the basis of predetermined temperature curves/holding times.

In particular, the disclosure can render possible the following advantages:

automatic change in measurement interval times
comparison of sterilization temperatures with predetermined curves
monitoring of an entire sterilization instead of limit value observations
adjustment of target parameters to the respective application or to individual sterilization processes
reliable detection of temperature cycles (sterilization)
reduction of energy consumption through self-sufficient operation
possibility to adjust the parameters to respectively given sterilization conditions
measurement intervals render possible the identification of holding times and incipient sterilizations In summary, it can be said that the disclosure renders possible a method and a system with which sterilizations can be reliably identified and checked with minimum energy consumption. Measurement intervals of e.g. five minutes for a sterilization identification and intervals of one minute for an analysis can be used in this case. The identification, analysis and change in mode can be performed in particular in a self-sufficient manner by the system and adjusted to different conditions.

BRIEF DESCRIPTION OF THE DRAWING FIGURES

Figure 2:
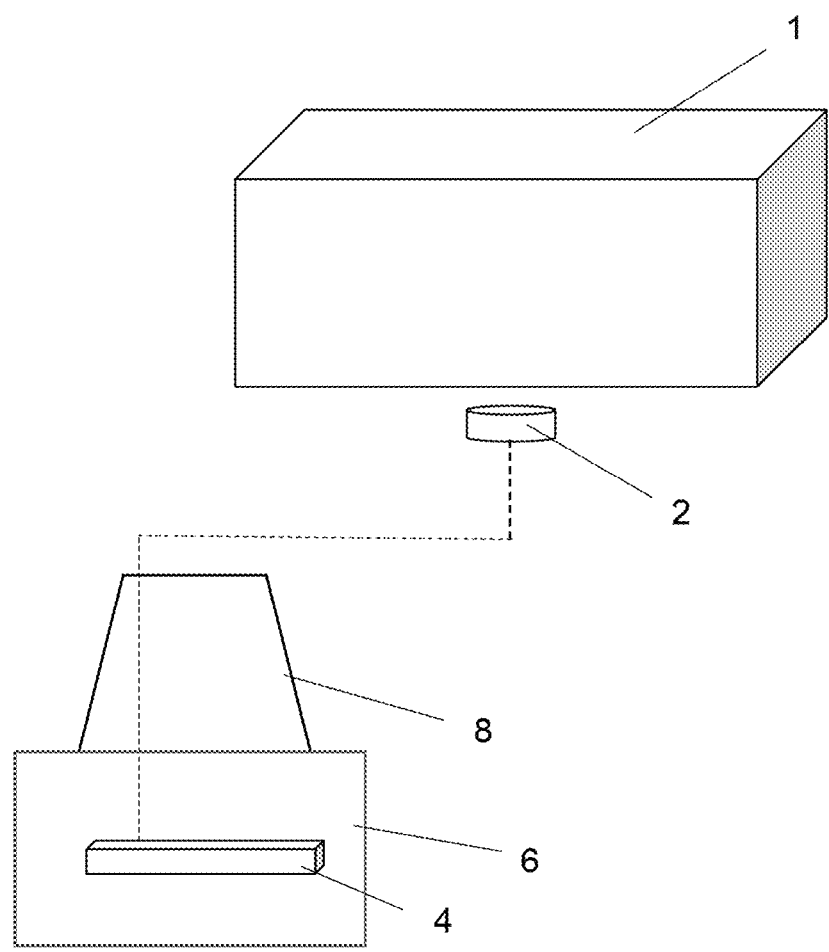

Further features and advantages of the present disclosure will be apparent from the following exemplary and non-limiting description of the drawings. These drawings are merely schematic in nature and are provided only for the purpose of understanding the invention. In these drawings:

FIG. 1 shows a schematic flow chart of an exemplary embodiment of the disclosure; and FIG. 2 shows a schematic diagram of a system according to the disclosure.

DETAILED DESCRIPTION

At the beginning of the exemplary embodiment of the method illustrated in FIG. 1, a temperature measurement device 1 in the form of a communicative temperature logger is used to detect temperatures to which a sterile container 2 is exposed at intervals/first intervals/first time intervals of five minutes (300 seconds). This monitoring is a kind of rough monitoring. Here, both the temperature of an atmosphere surrounding the sterile container 2 and the temperature of an atmosphere inside the sterile container 2 may be concerned. The temperature can be detected with one or more temperature sensors.

The detected temperatures are analyzed on the basis of the method and, in this context, compared with a first limit temperature value stored in a memory unit 4. This value can be adjusted as required. As long as the temperature values measured in the first time intervals do not exceed the first limit value temperature, the method and the system remain in rough monitoring by means of the first intervals. As soon as a sterilization is carried out with the sterile container 2, the temperature to which the sterile container 2 is exposed increases. If a temperature measured during this phase exceeds this defined first limit value, the logger 1 automatically switches to a sterilization mode. The latter represents a kind of fine monitoring of the sterile container 2 and the sterilization process. The system now initially assumes that the now detected temperature values are sterilization temperatures and that a sterilization process is being carried out with the sterilization container 2.

After the first limit temperature has been exceeded, i.e. in sterilization mode or fine monitoring, the interval time is reduced from the first interval duration to a second interval duration of one minute (60 seconds). Due to the then more frequent temperature measurements, holding times and temperature changes can be detected as accurately as possible during this entire phase. Furthermore, the detected temperature values or time values/holding times are stored in an internal memory 4 so that they can be evaluated later.

On falling below a second limit temperature or a certain period of time, the fine monitoring is finished. In some embodiments, the temperature measurement can also be terminated. The temperature values detected and stored during fine monitoring, as well as any time values/holding times that may be present, are compared with reference values stored in the system/memory 4, for example a sterilization temperature curve and/or a time curve. As a result, the times/holding times and temperatures/temperature curves/temperature changes that run during the process can be detected and checked (by means of a computer 6) so that an analysis and check of the conducted sterilization process on the basis of intended values/sequences (also by means of the computer) is made possible in a simple manner and, compared with a simple limit value observation according to the prior art, considerably safer.

If the measured/stored temperature values/time values are within a defined tolerance range, i.e. match the specification, the sterilization is classified as successful. In this case, either a computer-internal counter is incremented as a counter or an indicator is set as a display device 8 to make the successful sterilization visible to the outside. If the values do not comply with the specifications, i.e. if they are outside the tolerance range, this can either be made visible in a similar manner. Alternatively, the system can be set back to the original mode, i.e. to temperature monitoring with the first interval time duration. After detection and evaluation, the internal memory 4 is reset and the measurement interval for the ambient temperature is five minutes again.

The invention claimed is:

1. A method for automatic and sterile-container-specific detection of sterilization cycles carried out by a sterile container, the method comprising the steps of:
   A. detecting a temperature acting on the sterile container with a temperature measurement device at predetermined first time intervals;
   B. storing temperature values detected after a predetermined first limit temperature has been exceeded in a memory;
   C. suspending step B after the temperature falls below a predetermined second limit temperature or after a predetermined period of time has elapsed after the predetermined first limit temperature has been exceeded;
   D. comparing said temperature values with reference temperature values with a control unit;
   E. comparing temperature-specific holding time durations that are detected and stored in a memory after the predetermined first limit temperature has been exceeded with reference holding time durations to determine when the temperature-specific holding time durations deviate from the reference holding time durations;
   F. determining a deviation between said temperature values and the reference temperature values with the control unit;
   G. determining whether the sterilization cycle was carried out, based on whether the deviation is within a predetermined tolerance range, with the control unit; and
   H. actuating a counter and/or a display device after the control unit determines that the sterilization cycle was carried out.

2. The method according to claim 1, wherein the counter is not actuated and/or an error message is output and/or stored when the deviation is determined outside of the predetermined tolerance range.

3. The method according to claim 1, wherein the predetermined first time intervals are four to six minutes.

4. The method according to claim 1, wherein the temperature measurement device detects the temperature at predetermined second time intervals after the predetermined first limit temperature has been exceeded.

5. The method according to claim 4, wherein the predetermined second time intervals are 40 to 90 seconds.

6. The method according to claim 1, wherein the temperature measurement device detects the temperature again at the predetermined first time intervals after the temperature has fallen below the predetermined second limit temperature or after the predetermined period of time has elapsed.

7. The method according to claim 1, wherein the predetermined first limit temperature and/or the predetermined second limit temperature are adjustable.

8. A system for automatic and sterile-container-specific detection of sterilization cycles carried out by a sterile container, the system comprising:
   a temperature measurement device configured to detect a temperature acting on the sterile container;
   a memory;
   a control unit configured to determine when a sterilization cycle is carried out; and
   a counter and/or a display device,
   wherein the control unit is configured to
      detect the temperature at predetermined first time intervals with the temperature measurement device,
      store temperature values detected after a predetermined first limit temperature has been exceeded in the memory,
      suspend storage of said temperature values after the temperature has fallen below a predetermined second limit temperature or after a predetermined period of time has elapsed after the predetermined first limit temperature is exceeded,
      compare said temperature values with reference temperature values,
      determine when said temperature values deviate from the reference temperature values,
      compare temperature-specific holding time durations that are detected and stored in the memory after the predetermined first limit temperature has been exceeded with reference holding time durations to determine when the temperature-specific holding time durations deviate from the reference holding time durations,
      determine whether the sterilization cycle was carried out, based on whether said temperature values deviate from the reference temperature values within a predetermined tolerance range, and
      actuate the counter and/or the display device when said temperature values deviate from the reference temperature values within a predetermined tolerance range.

9. The system according to claim 8, wherein the temperature measurement device is a temperature logger.

10. The system according to claim 9, wherein the temperature logger is associated with the sterile container.

11. The system according to claim 8, wherein the counter and/or the display device comprises a counter that is an incrementable cycle counter that counts a number of sterilization cycles.

12. A non-transitory computer readable medium storing the steps according to claim 1.

* * * * *